March 17, 1953 R. D. GUNKEL 2,631,494
OPHTHALMIC TRIAL FOR LENSES
Filed March 30, 1951
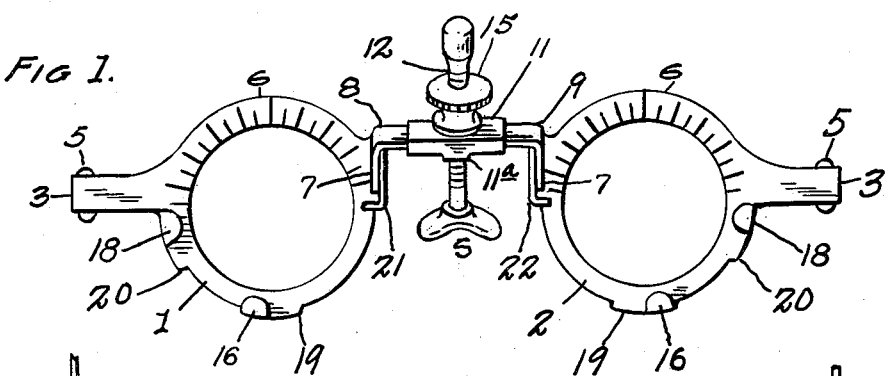
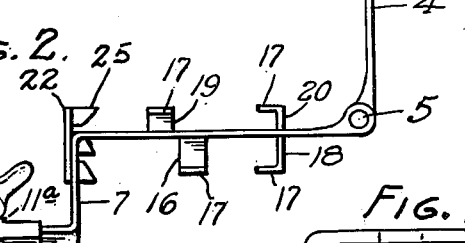
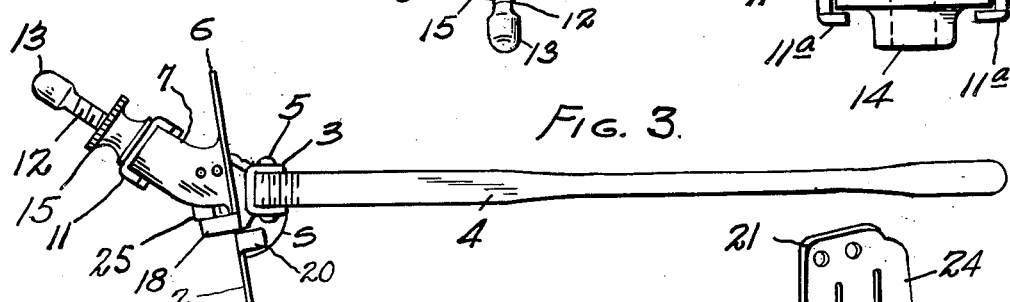
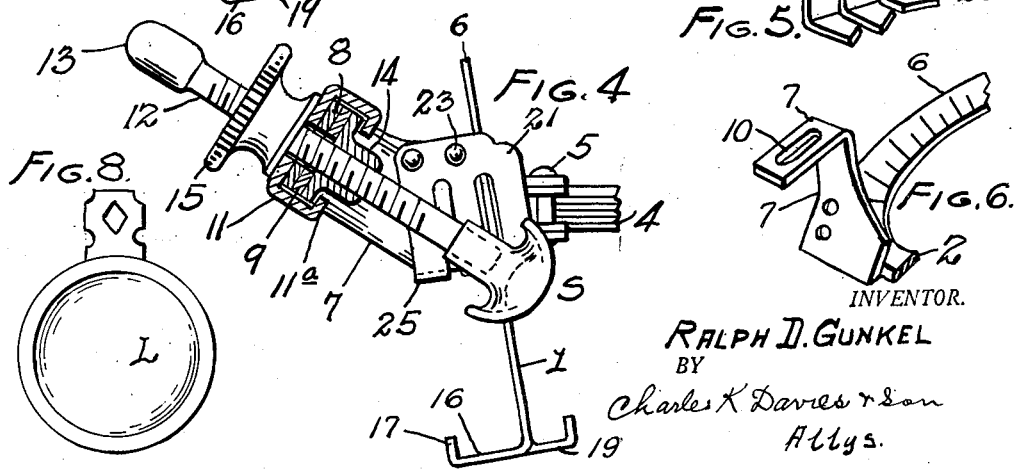
INVENTOR.
RALPH D. GUNKEL
BY
Charles K. Davies & Son
Attys.

Patented Mar. 17, 1953

2,631,494

UNITED STATES PATENT OFFICE 2,631,494

OPHTHALMIC TRIAL FRAME FOR LENSES

Ralph D. Gunkel, Chevy Chase, Md.

Application March 30, 1951, Serial No. 218,495

2 Claims. (Cl. 88—20)

The present invention relates to the general class of optical lens testers, and more specifically to an ophthalmic trial frame for lenses adapted to be worn or supported by a patient and employed by an optometrist, ophthalmologist, oculist, and other ophthalmic practitioners, in determining and testing the proper refractive correction for a patient's eyes.

The novel unitary trial frame of my invention is adapted to support one or a number of trial lenses in accurately predetermined positions before the eyes of a patient, and means are provided for measuring and adjusting the supported trial lenses for interpupillary distance, as well as for distance from the cornea of the eyes in order to approximate the distance of the ophthalmic correction. In actual use it is necessary that the trial lenses be fixedly held with respect to the patient's eye and visual axis, and that provision be made whereby at least one of the lenses may be manually rotated through an arc of one hundred and eighty degrees, in order to find and correct any astigmatic error present in the eyes.

The trial frame of my invention, which is simple in construction and operation, embodies a minimum number of parts that may be manufactured with facility, the parts may be assembled and adjusted with ease, and the unitary instrument, which is of light weight but strong and durable, may be manipulated with facility and convenience for maximum efficiency in the performance of its functions.

The invention essentially consists in certain novel features and combinations of parts involving complementary rim-sections provided with a laterally adjustable bridge assembly and nose-saddle, together with unique lens holders, as will hereinafter be particularly set forth. In the accompanying drawings I have illustrated one example of a physical embodiment of my invention, wherein the parts are combined and arranged in accord with one mode I have devised for the practical application of the principles of the invention. It will however be understood that changes and alterations are contemplated and may be made in these mechanical structures, within the scope of my appended claims without departing from the principles of the invention.

Figure 1 is a front view in elevation of a trial frame in which the invention is physically embodied.

Figure 2 is a top plan view with the temples broken away for convenience of illustration.

Figure 3 is a side elevation of the frame showing one of the temples.

Figure 4 is an enlarged transverse central sectional view with some parts in elevation.

Figure 5 is a perspective view of one of the pair of resilient lens-holding clips or clamps.

Figure 6 is a fragmentary view of one of the rim sections, showing one of the slotted bridge plates and a millimeter scale thereon for pupillary measurements.

Figure 7 is a detail view of the clamp members of the bridge assembly; and Figure 8 shows a standard lens used in the frame.

This unitary frame, of the spectacle type includes complementary right and left rim-sections that are preferably stamped, or otherwise shaped from aluminum, magnesium alloy or other light but strong material to assure rigid structures. Each rim-section comprises a flat rim or ring as 1 and 2 terminating in laterally extended arms 3, 3, to which the temples 4, 4, are pivoted at 5. These horizontally disposed temples or blades are preferably fashioned of flexible or pliable metal or material in order that they may readily be bent, if desired, to fit the head of a patient and assist in maintaining the trial frame in comfortable and desired position. While the frame is in operative position, and for determining the distance of a lens from the cornea of an eye that will approximate the distance of the ophthalmic correction, a thirty millimeter scale is displayed or marked on the exterior sides of the temples, and these scales are readily accessible for sighting from either the right side or the left side of a patient.

The upper halves of the circular rims are widened at 6 to accommodate a usual protractor gauge or scale for use with the lenses, one of which is shown at L in Fig. 8, and such a lens, when resiliently retained in a rim, may manually be turned through an arc of one hundred and eighty degrees with relation to the usual center mark of the gauge or scale.

The adjoining inner edges of the rim-sections are each equipped with an upwardly and forwardly projecting bracket arm 7, 7, that terminates in an angular horizontally disposed bridge-plate, as 8 and 9, and these overlapped plates are fashioned with registering slots as 10. For measuring the pupillary distance of the eyes each plate is equipped with a millimeter scale upon its upper side or surface for coaction with a bridge member 11. The lapped bridge-plates forming part of the bridge assembly, are inserted from opposite ends of the flat tubular bridge member 11, and they may be longitudinally moved in laterally adjusting the rim-sections, the opposite ends of the bridge member affording accurate guides for coaction with the two millimeter scales.

This tubular bridge member in which the slotted plates are enclosed consists of an open-bottom housing which is closed by a movable draw plate or loose bearing plate 14 that is provided with a central threaded bore, and the bearing plate is retained against displacement by means of opposed retaining lugs 11a of the housing 11 that project beneath the bottom of the bearing plate or draw plate. The bearing plate may be pressed against the bridge plates for clamping them together and thus rigidly hold the rim-sections in adjusted position for pupillary measurements.

For clamping the bridge assembly in rigid relation of its parts I employ an adjusting bar or threaded clamp bar 12 that may be manually turned by grasping the handle or head 13 on its upper end. The adjusting bar is passed through a hole in the upper wall of the housing 11 and through the registering slots of the adjusting plates, and it is threaded through the central bore of the draw plate or bearing plate 14. The adjusting bar is of ample length to extend above and below the bridge portion and the threaded portion of the bar is of ample length for coaction with the threaded bore of the draw plate in adjusting the relative position of the bar. The bridge assembly and the adjusting bar are locked in position by means of a clamp nut 15 threaded on the bar above the assembly.

Upon the lower end of the adjusting bar is rigidly mounted a nose-engaging member or saddle S, fashioned of hard plastic, or other suitable material and shaped to conform to the nose of a patient. Due to the angular position of the adjusting bar, it may be turned to simultaneously adjust the nose-saddle in both a vertical and a horizontal plane with respect to the nose of the patient. The longitudinal axis of the bar extends in a plane perpendicular to the line of the nose, and therefore the saddle is adjustable as to height as well as toward and from the nose. By this combination of parts, the nut 15 may be employed to simultaneously lock the bridge assembly and the saddle in adjusted position.

The lens-sections are slightly tilted forwardly from the horizontal plane of the temples to accurately and comfortably fit in desired position against the face of the patient, and without encumbering or protruding parts at the rear of the frame that would interfere with proper positioning of the instrument.

In Fig. 7 one of several standard types of lenses is illustrated as L, which may be applied to the frame or withdrawn therefrom and manually manipulated by grasping the handle at the top of the lens.

Each of the rim-sections is equipped with means for receiving and resiliently holding one or more lenses at both the front and rear sides of the rims of the sections, and the lenses are retained in position for adjustment with relation to the protractor scales on the arcuate scale plates 6, 6.

For this purpose the lower portion of each rim-section is fashioned with an integral, lower or base arm 16, having an upturned retaining lug 17 and projecting from the front of the rim, together with an outer side holder-arm 18 terminating in a retaining lug. Each rim is also fashioned with a lower lens holder or arm 19 having a retaining lug and projecting from the rear of the rim, and a complementary side holder 20 also projecting to the rear, and provided with retaining lugs.

The front lens holders are of ample size to receive and retain either one or two lenses, while the rear sets of holders are of a size to accommodate one lens; in either case the lenses being slipped into position from above and manually adjusted with relation to the protractor scales.

For rigidly clamping the lenses in adjusted position in the holders, each frame section, or rim-section, is equipped with a stainless steel multi-blade resilient detent or clamp plate, as 21 or 22, riveted at 23 to a bracket-arm 7. As best seen in Fig. 5 each clamp plate or detent is slotted to form a plurality of depending and resilient blades 24, and each blade terminates in an angular lug 25 preferably fashioned with a bias front edge.

These resilient detents or spring clamp plates are located in the path of a lens as it is being inserted in the holders, and as the edge of the lens contacts a spring blade, the blade is pushed back and placed under tension thereby resiliently retaining the lens in its holders. A lens may readily be turned or adjusted within an arc of one hundred and eighty degrees in accord with the protractor scale and there resiliently retained, and with equal facility the lenses may be withdrawn from the holders.

After the rim-sections of the trial frame have been adjusted with the lenses centered in front of the cornea of the eyes, the holders are of ample width to permit adjustment of a lens in accurately locating the frame toward or away from the cornea of the eye.

Having thus fully described my invention, what I claim and desire to secure by Letters Patent is:

1. In an optical trial frame having a pair of hinged and horizontal temples, the combination with forwardly tilted and complementary rim-sections disposed in a plane angular to the temples, a laterally adjustable forwardly projecting bridge assembly uniting the rim-sections and disposed in a plane at an angle to the plane of the rim-sections, an adjustable screw bar located in a plane at an angle to the rim sections and threaded through the bridge assembly, a nose-saddle rigid with the lower end of said bar, and a lock nut on the screw bar coacting with the bridge assembly for simultaneously locking the bridge assembly and nose-saddle in adjusted position.

2. In an optical frame, the combination with complementary rim sections each having a forwardly projecting bracket arm, horizontally disposed lapped and slotted bridge plates integral with the bracket arms, and a tubular bridge member including a loosely mounted bearing plate having a central bore and enclosing said plates, an adjusting screw bar passed freely through the bridge member and the slotted plates and threaded through said bore, a nose saddle rigid with the lower end of the bar, and a lock nut threaded on the bar for engagement with the upper face of the bridge member for simultaneously locking the slotted plates within the bridge member, and the nose saddle, in adjusted position.

RALPH D. GUNKEL.

REFERENCES CITED

The following references are of record in the file of this patent:

UNITED STATES PATENTS

| Number | Name | Date |
| --- | --- | --- |
| 437,030 | Hinden | Sept. 23, 1890 |
| 528,716 | Celles | Nov. 6, 1894 |
| 1,096,169 | Herold | May 12, 1914 |
| 1,793,211 | Day et al. | Feb. 17, 1931 |
| 2,333,738 | Peck et al. | Nov. 9, 1943 |
| 2,447,936 | Ellis | Aug. 24, 1948 |